June 7, 1938.  E. J. STERBA  2,119,607

RADIO COMMUNICATING SYSTEM

Filed Aug. 25, 1934  2 Sheets-Sheet 1

INVENTOR
E. J. STERBA
BY
J. G. Roberts
ATTORNEY

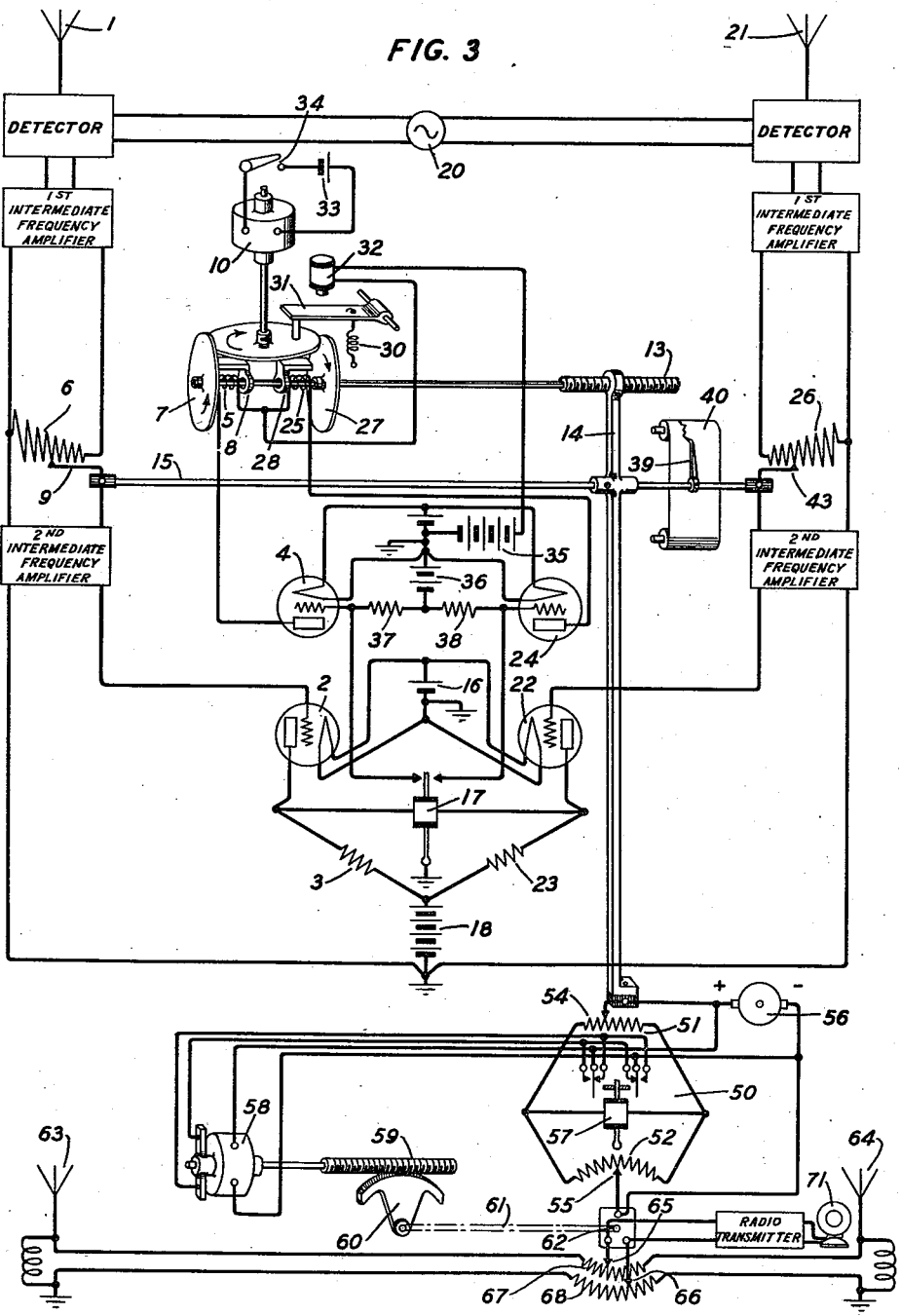

Patented June 7, 1938

2,119,607

UNITED STATES PATENT OFFICE 2,119,607

RADIO COMMUNICATING SYSTEM

Ernest J. Sterba, Asbury Park, N. J., assignor to Bell Telephone Laboratories, Incorporated, New York, N. Y., a corporation of New York Application August 25, 1934, Serial No. 741,355

19 Claims. (Cl. 250—11)

This invention relates to radio systems and more particularly to a system and method for determining the best combination of an antenna array to be employed in radio communication.

An object of this invention is to obtain more efficient reception and transmission in radio communication by selection of the most desirable combination of antennae at any time.

Another object of this invention is to control the angular characteristic of a transmitted signal at a transmitting station in accordance with that of a received signal.

With highly directive antenna arrays, variations in the relative intensities of signals induced in any antenna of the array occur over relatively short periods of time. Many factors are responsible for these variations. Perhaps the most directly significant cause is the several angles at which received waves strike the plurality of antennae of the array. The intensities of waves arriving at several angles vary with time. This variation in the angle over a period of time is most evident when the directive pattern of one or more antennae is narrow.

In accordance with a feature of this invention, the comparative reception by each of a plurality of antennae of an incoming signal is indicated simultaneously. Since the intensity of the signal induced in each of the plurality of antennae varies with the angle at which a wave strikes each antenna and the angle at which maximum intensity is obtained changes over relatively short periods of time, it is desirable to use antennae for reception, the maximum intensities of which are obtained with different angles of the received wave. Stated differently, the two antenna arrays or systems have different directive diagrams. Antennas of dissimilar configuration, and identical horizontal antennas positioned at different heights above the ground, ordinarily have different directive diagrams. The signals induced in each of the plurality of antennae are passed through substantially similar apparatus. The intensities of the output of the apparatus are a direct index of the angle at which the signal is induced in each of the plurality of antennae with which the apparatus is associated. The intensities of the output of the apparatus are then substantially equalized simultaneously and the amount of adjustment required for rendering them equal determined. The necessary amount of adjustment is directly correlated with the comparative receptive qualities of each of the plurality of antennae. Accordingly, the most desirable combination of antenna can be selected for reception at any given time. From the relative amount of adjustment required, the angle at which the waves strike the antenna can also be ascertained.

In accordance with another feature of this invention, the angle of fire or the angle at which waves are transmitted from a plurality of antennae is controlled. The angle at which a received wave strikes an antenna at the transmitting station is caused to produce a condition and the condition controls the phase angle of the signals supplied to each of the plurality of transmitting antennae. The automatic control of the phase angle of the signals supplied to each of the plurality of transmitting antennae results in the transmission of signals by the plurality of transmitting antennae to correspond to the angle of a received wave at any time.

A more comprehensive understanding of this invention is obtained by reference to the accompanying drawings in which, Fig. 1 is a schematic showing of an embodiment of this invention for determining the comparative receptive qualities of each of a plurality of antennae;

Fig. 3 is a schematic showing of a system for controlling angular characteristics of a transmitted signal in accordance with that of a received signal.

Figure 1:
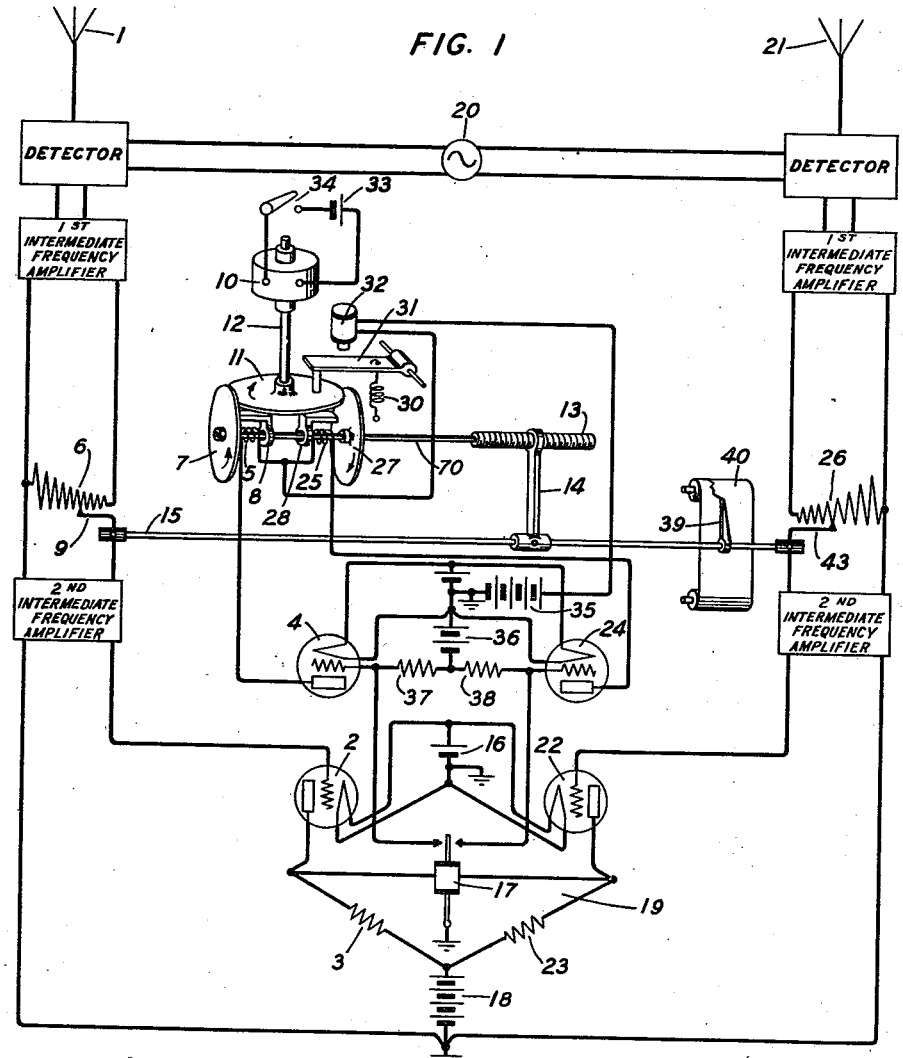

Referring to Fig. 1, the numerals 1 and 21 represent two antennae upon which received signals are impressed. Identical detection receiving units symmetrically disposed about a common beating oscillator are associated with each of the antennae. These units comprise a detector connected directly to each antenna, a first intermediate frequency amplifier connected to the detector, and a second intermediate frequency amplifier connected to the first intermediate frequency amplifier by means of an adjustable attenuator. The detector, the first intermediate frequency amplifier and the second intermediate frequency amplifier, the apparatus comprising which are well known in the radio communication art, are represented by block diagrams and labeled in the drawings. A common oscillator 20 supplies oscillations to each of the detectors associated with antennae 1 and 21 in accordance with the well known superheterodyne circuit.

The current outputs of the second intermediate frequency amplifiers associated with the two antennae operate a differential or polarized relay 17 which controls mechanically interlocked and electrically driven attenuators, one in each of the outputs of the first intermediate frequency amplifiers. The connections are such that when the current output of one unit exceeds that of the other unit, loss is inserted in the unit with the high output and simultaneously loss is withdrawn from the other unit with the low current output. Thus, the interlocked attenuators actuated by the differential relay tend to maintain the current outputs of the two receiving units equal. To accomplish this, the output of the second intermediate frequency amplifier associated with antenna 1 is connected to the input circuit of a space discharge device 2, while the output of the second intermediate frequency amplifier associated with the antenna 21 is connected with the input of a space discharge device 22. The output circuit of the space discharge device 2 forms one arm of a Wheatstone bridge 19, while the output circuit of space discharge device 22 forms another arm of the Wheatstone bridge. Two equal impedances 3 and 23 form the other two adjacent arms. Space current for space discharge devices 2 and 22 is supplied by a unidirectional current source 18 through resistances 3 and 23, respectively, of the bridge circuit. A source 16 furnishes heating current for the cathodes of devices 2 and 22. The polarized relay 17 is connected across two opposite terminals of the Wheatstone bridge.

A space discharge device 4 is associated with one of the contacts of the relay 17, while another space discharge device 24 is associated with the other contact of the relay 17. Electromagnets 5 and 25 are respectively connected to the output circuits of devices 4 and 24. The energization of either electromagnet 5 or 25 actuates clutch mechanism to substantially equalize the intensity of the output currents of the second intermediate frequency amplifiers.

Connected between the first and second intermediate frequency amplifiers associated with antenna 1, is an adjustable attenuator 6. A similar attenuator 26 is connected between the first and second intermediate frequency amplifiers associated with the antenna 21. These adjustable attenuators are of the potentiometer type non-inductively wound upon logarithmically tapered cards. A pair of contacts 9 and 43 are associated respectively with the attenuators 6 and 26 and serve to control the attenuation introduced into the circuits between the first and second intermediate frequency amplifiers with which the attenuators are respectively associated. Each of these contacts 9 and 43 is fixedly attached to an insulated rod 15 capable of moving from right to left. The attenuators 6 and 26 are constructed so that a movement of the rod 15 with the corresponding movement of the contacts 9 and 43 to the right or left, results in an increase in the attenuation introduced into the circuit between the first and second intermediate frequency amplifiers of one receiving unit and a simultaneous decrease in the attenuation in the circuit between the amplifiers of the other.

A bracket 14 is fixedly attached to the rod 15 at one end. The other end of the bracket 14 has a threaded aperture and a lead screw 13 is adapted to pass through and engage the threads of this aperture. The rotation of the lead screw 13 in a clockwise direction moves the bracket 14 and the rod 15 to the left, while a counter-clockwise movement of the screw 13 results in the movement of the bracket 14 and of rod 15 to the right. A needle 39 fixedly attached to the rod 15 records the movement from right to left of the rod 15 on a constantly moving chart 40.

Two discs 7 and 27 are slidably movable along a rod 70 which forms an extension of the lead screw 13. These discs are rotated by engagement with a friction drive 11 fixedly attached to a shaft 12 of an electric motor 10. The motor is supplied with current by a battery 33 through a switch 34. Two clutch members 8 and 28 are respectively associated with and actuated by electromagnets 5 and 25.

The limits within which the discs 7 and 27 are slidable along the rod 70 are such that the actuation of clutch members 8 and 28 results in the engagement of the drive 11 with disc 7 or 27, respectively, without disturbing the position of the lead screw and bracket 14 at the instant of engagement of disc and drive. The rod 70 is preferably square in cross-section to afford movement of each disc along the rod and insure rotation of the rod and lead screw when either disc engages the drive. Each of the discs is biased toward the drive (biasing not shown) so that the actuation of either clutch member results in the engagement of its respectively associated disc with the drive.

An electromagnetic brake prevents the rotation of the drive 11 when no current passes in the output of space discharge device 4 or 24. The brake comprises the electromagnet 32 and an armature 31. The armature is biased by the spring 30 away from the electromagnet and is normally in contact with a stop on the drive 11 to prevent the rotation of the drive. The electromagnet 32 is in a circuit which is common to the output circuits of devices 4 and 24. Consequently, when current passes in the output circuits of either device 4 or 24, electromagnet 32 is energized. When the electromagnet 32 is energized, the armature 31 is removed from engagement with the drive 11 thereby permitting the drive to rotate. However, when the electromagnet 32 is deenergized, the armature 31 prevents the drive 11 from rotating.

Space current for devices 4 and 24 is supplied by unidirectional current source 35 through the electromagnet 32 common to the output circuits of both devices 4 and 24 and the electromagnets 5 and 25 in the respective output circuits of devices 4 and 24. The control electrodes of devices 4 and 24 are normally biased negatively by a source 36 through resistances 37 and 38, respectively, so that no appreciable current passes in the output circuits of these devices until the armature of relay 17 engages with the contact associated with either of the input circuits of these devices.

When incoming waves reach antennae 1 and 21, they are impressed upon the input of the detector associated with each of the antennae and are therein combined with oscillations supplied by the oscillator 20. From the detectors, the intermediate frequency waves pass through the first and second intermediate frequency amplifiers associated with each of the antennae. The radio frequency electromotive force impressed on the control electrodes of devices 2 and 22 produce variations in the anode current supplied to these devices depending upon the intensities of the electromotive force. If the intensities of the electromotive force from each second intermediate frequency amplifier are not the same, the variations of anode currents supplied to devices 2 and 22 become unequal and the impedances of the arms of the bridge containing the devices are likewise unequal. Since impedances 3 and 23 of the Wheatstone bridge 19 are equal, an unbalance of the bridge results and relay 17 is energized. The engagement of the armature of this relay with one of the contacts associated with either device 4 or 24 removes the negative bias from the control electrode of the device with which the engaged contact is associated. Current passes in the output circuit of the device from which the negative bias is removed. Electromagnet 32 is energized together with either electromagnet 5 or 25 depending upon whether the current passes through device 4 or 24, respectively. The energization of relay 32 removes the armature 31 from engagement with the drive 11, while the energization of either electromagnet 5 or 25 results in the engagement of either wheel 7 or 27 with the drive 11, respectively. If the electromagnet 5 is energized, the clutch member 8 is actuated to engage the disc 7 with the drive 11. This latter engagement results in a counter-clockwise movement of the lead screw 15. This counter-clockwise movement of the lead screw 13 moves the bracket 14 with the rod 15 attached thereto to the right. The movement of the rod 15 to the right increases the attenuation introduced by the attenuator 6, while it decreases the attenuation introduced by the attenuator 26.

The engagement of the wheel 27 with the drive 11, on the other hand, results in a clockwise movement of the lead screw 13 and a movement to the left of the bracket 14 and the rod 15. This action increases the attenuation introduced by the attenuator 26 and decreases the attenuation introduced by the attenuator 6 associated with the antenna 1.

At any time if the intensity of the output of the second intermediate frequency amplifier associated with one antenna becomes greater than that associated with the other antenna of an array, greater attenuation between the first and second intermediate frequency amplifiers associated with the first antenna is introduced by its respectively associated attenuator, while the attenuation introduced by the attenuator in the receiving unit of the second antenna between the first and second intermediate frequency amplifiers of the second antenna is automatically reduced. This increase in the attenuation in the receiving unit associated with one antenna and the decrease in the attenuation of that of the other antenna continues until the intensities of the outputs of the second intermediate frequency amplifiers of both units are equal.

When the intensity of the output of the second intermediate frequency amplifier associated with the antenna 1 is greater than that of the second intermediate frequency amplifier associated with the antenna 21, the impedance of the output circuit of space discharge device 2 becomes less than that of the output of space discharge device 22. Disc 7 engages with the drive 11 to rotate the lead screw 13 in a counter-clockwise direction. This counter-clockwise movement of the lead screw 13 produces a movement to the right of bracket 14 and rod 15. As a result of the corresponding movement of contacts 9 and 43, the attenuation introduced by attenuator 6 between the first and second intermediate frequency amplifiers associated with the antenna 1 is increased while the attenuation introduced by attenuator 26 between the first and second intermediate frequency amplifiers associated with antenna 21 is decreased. This change in attenuation between the first and second intermediate frequency amplifiers associated with these antennae results in an equalization of the intensity of the output of each of the second intermediate frequency amplifiers. When the intensities of these outputs are equal, relays 5 and 32 are deenergized to disengage wheel 7 from the drive 11 and to apply the brake 32 to the drive 11 thereby preventing further changes in the attenuation between the first and second intermediate frequency amplifiers associated with each of the antennae.

If the intensity of the output of the second intermediate frequency amplifier associated with antenna 21 is greater than that of the second intermediate frequency amplifier associated with antenna 1, in a similar manner, greater attenuation is introduced by the attenuator 26 and the attenuation introduced by attenuator 6 is reduced until the intensities of the outputs of the intermediate frequency amplifiers associated with each antenna are substantially equal. Since the needle 39 fixedly attached to the rod 15 records the movement of that rod on the constantly moving chart 40 and since the movement of that rod from right to left is directly correlated with the attenuation required to be introduced by attenuators 6 and 26 in the receiving units of antennae 1 and 21, respectively, to equalize the intensities of the outputs of these units, the chart shows directly the comparative receptive qualities of the antennae 1 and 21 over a period of time.

Figure 2:
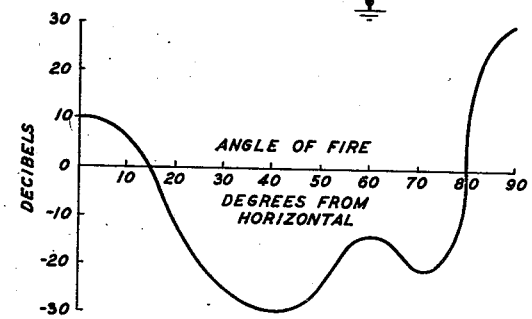
Fig. 2 shows the comparative changes in reception of two antennae with variation in the angle of fire of received waves or, stated differently, illustrates the difference in the simultaneous outputs from two antennae having different directive characteristics.

When the angle at which waves are received varies, the difference in intensity of the outputs of the intermediate frequency amplifiers associated with antennae 1 and 21 changes. This condition is more clearly shown in Fig. 2 which illustrates the variation in intensity of an antenna compared with a standard antenna with various angles of fire of received waves. The amount of increase or decrease above or below that of the standard antenna appears in decibels. The variation in the intensity of the received signals is particularly noticeable in certain portions of this curve. For example, in the region of fifteen degrees the curve is extremely steep. If the signal is arriving at angles in this vicinity, considerable variation in the intensity of the two antennae would result.

Fig. 3 shows a system for the control of the angle at which waves are transmitted from a plurality of antennae in accordance with the angle at which received waves strike a plurality of receiving antennae.

The angle at which waves are received at a point from a distant radio station is correlated with the most desirable angle at which to transmit from the point to the station if the same antenna array is employed at the distant station for transmission and reception. Since the angle at which waves are received from the distant station varies over a period of time, the most desirable angle at which to transmit from the point to the distant station also changes.

In the system to be hereinafter described, two pluralities of antennae are employed, one for receiving and another for transmitting. Each of the plurality of receiving antennae have identical receiving units comprising detectors and amplifiers. The current outputs of these receiving units operate a differential or polarized relay to control mechanically interlocked and electrically driven gain controls, one in each of the receiving units. The connections are such that when the current output of one unit exceeds that of another unit, loss is inserted in the unit having higher intensity while loss is removed from the other. The increase and decrease of the attenuation of these receiving units continue until the intensities of the outputs of all the units become substantially equal.

The gain control mechanism associated with the plurality of receiving antennae actuates a phase shifter connected to the plurality of transmitting units. The phase shifter controls the phase of the signal transmitted from each of the plurality of transmission antennae. The actuation of the phase shifter by the gain control mechanism is such that the angle at which waves are transmitted from the plurality of transmitting antennae at a station varies with changes in the angle at which waves are received at that station. This variation in phase of the waves transmitted from each of the plurality of transmitting antennae results in the sending of waves from the station at substantially the most desirable angle to the remote station from which signals are being received.

The plurality of receiving antennae, the receiving units associated with each of the receiving antennae and the gain control mechanism are the same, have the same function and operate in a similar fashion to the system shown in Fig. 1 and described heretofore. Accordingly, these parts of the system shown in Fig. 3 have identical numerals as those appearing in Fig. 1 and their function and operation are not repeated at this point.

The actuation of a phase shifter associated with a plurality of transmitting antennae is accomplished by the movement of the bracket 14. As explained for the system shown in Fig. 1, the bracket 14 moves in response to a change in the relative intensities of the output of the receiving units associated with the plurality of receiving antennae 1 and 21. Fixedly attached to this bracket 14 is a contact 54 which controls the impedance of two arms of a Wheatstone bridge 50. The Wheatstone bridge 50 comprises a non-inductively wound resistance 51 with which the contact 54 is slidably engageable and another non-inductively wound resistance 52. A contact 55 fixedly attached to a rotatable member 62 is slidably movable along resistance 52. The contacts 54 and 55 comprise two terminals of the bridge 50. Across the common connecting points of resistances 52 and 54 comprising the other two terminals of the bridge, a polarized relay 57 is connected. A source of power 56 is connected to the two contacts 54 and 55. A reversible motor 58 supplied with power by the source 56 is controlled by the relay 57. The motor 58 rotates a lead screw 59. A bell crank 60 is in engageable relation with the lead screw 59. Bell crank 60 is fixedly attached at one end of a shaft 61, while at the other end of the shaft 61 the rotatable member 62 is fixedly attached. The rotatable member also controls a phase shifter placed between two transmitting antenna arrays 63 and 64. This control of the phase shifter is accomplished by two contacts 65 and 66 fixedly attached to the rotatable member 62 which ride on two impedances 67 and 68, respectively. The contacts 65 and 66 are connected to leads from a radio transmitter, while the two impedances 67 and 68 are connected to two transmitting antennae 63 and 64. The input of the radio transmitter is connected to a microphone 71.

The impedances 67 and 68 are connected to the antennae 63 and 64 so that a movement of the contacts 65 and 66 results in an increase in the electrical wave length of one antenna circuit and a decrease in that of the other. If no standing waves exist on the line leading to an antenna by simply changing the length of the line, the phase of the transmitted signal is shifted. Accordingly, if the length of the line leading to one of the antennae 63 or 64 is increased by movement of the contacts 65 and 66 along impedances 67 and 68, respectively, that leading to the other is decreased and the relative phase of waves transmitted by each antenna is changed. The resistances 51 and 52 are of such value and wound in such fashion that the signal is transmitted from antennae 63 and 64 at an angle which corresponds with that of the signals received by antennae 1 and 21.

When the angle at which the received waves are impressed on the antenna 1 or 21 varies, one of the discs 7 or 27 engages with the drive 11 to rotate the lead screw 13 in a counter-clockwise or clockwise direction depending upon which disc engages with the drive 11. This moves the lever 14 to the left or to the right. The movement of the lever 14 with the corresponding movement of the contact 54 changes the relative impedance of the two arms of the bridge comprising the resistance 51. Accordingly, the Wheatstone bridge 50 is unbalanced and the armature of relay 57 operates the motor to rotate the lead screw 59 and bell crank 60 together with shaft 61. The rotatable member 62 moves the contacts 55 across resistance 52 until the bridge is balanced. When the bridge is balanced, the phase shifter will have been adjusted by the rotation of contacts 65 and 66 on resistances 67 and 68 to transmit signals from antennae 63 and 64 to correspond with the angular characteristics of the waves impressed upon antennae 1 and 21.

While preferred embodiments of this invention have been described and illustrated, various modifications therein may be made without departing from the scope of the appended claims.

What is claimed is:

1. In combination, a plurality of antennae, amplifying means associated with each of said antennae for amplifying a signal received by its respectively associated antenna, regulating means for maintaining the intensities of the outputs of each of said amplifying means substantially the same, and means controlled by said regulating means for comparing simultaneously the relative receptive characteristics of each of said plurality of antennae.

2. A method of determining the relative receptive characteristics of a plurality of antennae comprising passing a signal impressed on each of said antenna through similar apparatus, automatically adjusting the intensities of the outputs of each of said apparatus to substantial equality and automatically measuring the adjustment required to determine the relative receptive characteristics of each of said antennae.

3. A system for controlling the directional characteristics of a transmitting antenna system comprising a plurality of transmitting antennae, a plurality of receiving antennae, means for ascertaining the angle at which an incoming wave is impressed on said plurality of receiving antennae and means actuated by said first stated means for transmitting a signal from said plurality of transmitting antennae at an angle which corresponds substantially to that of said incoming wave.

4. A system for controlling the directional characteristics of transmitting antennae system comprising a plurality of transmitting antennae, means for ascertaining and measuring the angle of an incoming wave and means, actuated by said first stated means, for transmitting a signal at an angle from said plurality of transmitting antennae to conform substantially to the angle of said incoming wave.

5. In combination a plurality of antennae, a receiving unit associated with each of said antennae an output circuit connected to each of said units and means jointly controlled by the relative intensities of the currents in said output circuits for automatically varying the attenuation of all of said receiving units whereby the current outputs of each of said units are maintained at substantially the same value.

6. In combination a plurality of antennae, a receiving unit associated with each of said antennae, an output circuit connected to each of said units and means jointly controlled by variations in the intensities of current in said output circuits for varying simultaneously the attenuation of each of said units to equalize substantially the intensities of the current in each of said output circuits.

7. A system for controlling the directional characteristics of a transmitting antenna system comprising means for ascertaining the angle of an incoming wave and a phase shifting device responsive to said means for transmitting signals at an angle by said system to conform with the angle of said incoming wave.

8. A system for determining the angle of an incoming wave impressed on a plurality of antennae comprising a detector and an amplifier associated with each of said antennae, each of said detectors and each of said amplifiers having similar characteristics, a gain control associated with each of said amplifiers, said gain controls being mechanically interlocked and responsive to changes in the intensities of the current of said amplifiers for maintaining the intensities of the output of said amplifiers substantially equal and a measuring device operated by said gain control for indicating the angle of an incoming wave impressed on said plurality of antennae.

9. A system for controlling the directional characteristics of a transmitting antenna system comprising a plurality of receiving antennae, a plurality of transmitting antennae, a detector and amplifier associated with each of said receiving antennae, each of said detectors and each of said amplifiers having substantially identical characteristics, a mechanically interlocked gain control responsive to changes in the intensities of the current outputs of said amplifiers for maintaining the intensities of the output of these amplifiers substantially equal and for ascertaining the angle of an incoming wave and a phase shifting device controlled by said gain control for transmitting signals from said plurality of transmitting antennae to conform with the angle of said incoming wave.

10. In a radio system, a plurality of antennae, a differential recorder comprising an oscillator, demodulating means associated with each of said antennae for demodulating a received signal with the output of said oscillator, an amplifier associated with each of said demodulating means, an output circuit connected to said amplifier, regulating means for maintaining the intensities of signals of each of said output circuits substantially the same and means, controlled by said regulating means, for indicating the relative receptive qualities of each of said plurality of antennae simultaneously.

11. A radio system comprising a plurality of antennae, amplifying means connected to each of said antennae for generating an electromotive force, the intensity of which is dependent upon the characteristic of a signal impressed on its respectively associated antenna, compensating means for compensating for the differences in intensity of the electromotive force generated by each of said amplifying means to generate an electromotive force of substantial equal intensity from each of said plurality of antennae and means, actuated by said compensating means, for comparing simultaneously the relative receptive characteristics of each of said plurality of antennae.

12. A radio system comprising a plurality of fixed antennae, means, associated with each of said antennae, for detecting and amplifying a signal impressed on its respectively associated antenna, regulating means for rendering said amplified signals of said first stated means substantially the same and means, controlled by said regulating means, for comparing simultaneously the relative receptive characteristics of each of said plurality of antennae.

13. A method of determining the relative receptive characteristics of a plurality of antennae, comprising passing a signal impressed on each of said antennae through substantially similar apparatus, compensating the differences in intensities of the signals generated in the outputs of each of said apparatus to produce a signal from each antenna having substantially the same intensity and measuring the compensation required.

14. In combination, two antennae, a receiving unit connected to each of said antennae for translating signals impressed upon its respectively associated antenna, an output circuit connected to each of said units, and means controlled by a difference in the intensities of the currents of said output circuits for increasing the gain in one of said units and decreasing the gain in the other of said units whereby the intensities of the currents in said output circuits are maintained substantially the same.

15. A system for controlling the characteristics of a transmitted signal from a plurality of transmitting antennae, comprising a plurality of transmitting antennae, a plurality of receiving antennae, means connected to said receiving antennae for producing a condition which is characteristic of the angle of fire of waves impressed on all of said receiving antennae and means connected to said plurality of transmitting antennae and controlled by said condition for transmitting waves which correspond to the angular characteristics of the waves impressed on said receiving antennae.

16. A radio communication system comprising a plurality of receiving antennae, a plurality of transmitting antennae, means connected to said receiving antennae for ascertaining the angular paths of waves impressed upon said receiving antennae and means connected to said plurality of transmitting antennae and responsive to said first stated means for transmitting signals from said plurality of transmitting antennae in an angular path corresponding to the path of said received signal.

17. In combination, two wave absorbing systems each comprising a straight antenna, said antennae being positioned parallel and said systems having different known vertical plane directive characteristics, and means controlled by the absorbed energies for indicating the incoming direction in said vertical plane of a desired wave.

18. In combination, two receiving antenna systems having different known directive characteristics in a desired plane of radiant action, indicant means controlled by the received energies for indicating the incoming direction in said plane of a desired wave, a directive transmitting system including means for changing its direction of transmission, and coupling means controlled by the indicant means and controlling the last-mentioned means, whereby the transmitted wave and incoming wave follow the same path.

19. In combination, two straight vertical receiving antennae having different known directive characteristics in a given vertical plane, different translation devices connected thereto, each including an output circuit, and means controlled by the output currents for continuously indicating the difference in intensity of the currents established in said antennae by a wave having an incoming direction in said plane, whereby all incoming directions assumed by said wave during a given period are ascertained.

ERNEST J. STERBA.